May 15, 1951  K. A. LEUSCHNER  2,552,984
METHOD FOR FILLETING FISH
Filed March 11, 1949  2 Sheets-Sheet 1
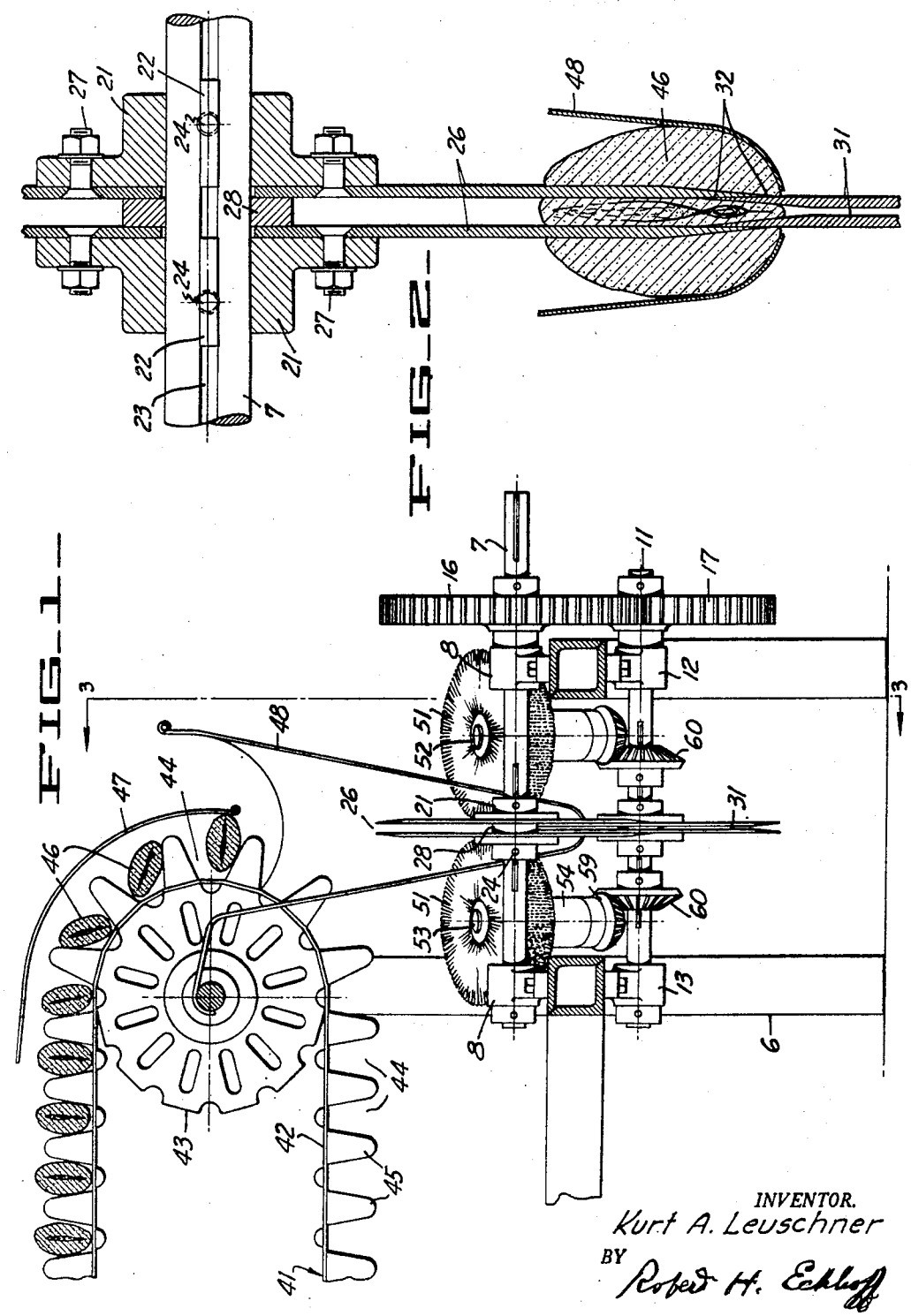
INVENTOR.
Kurt A. Leuschner
BY
Robert H. Eckhoff
ATTORNEY

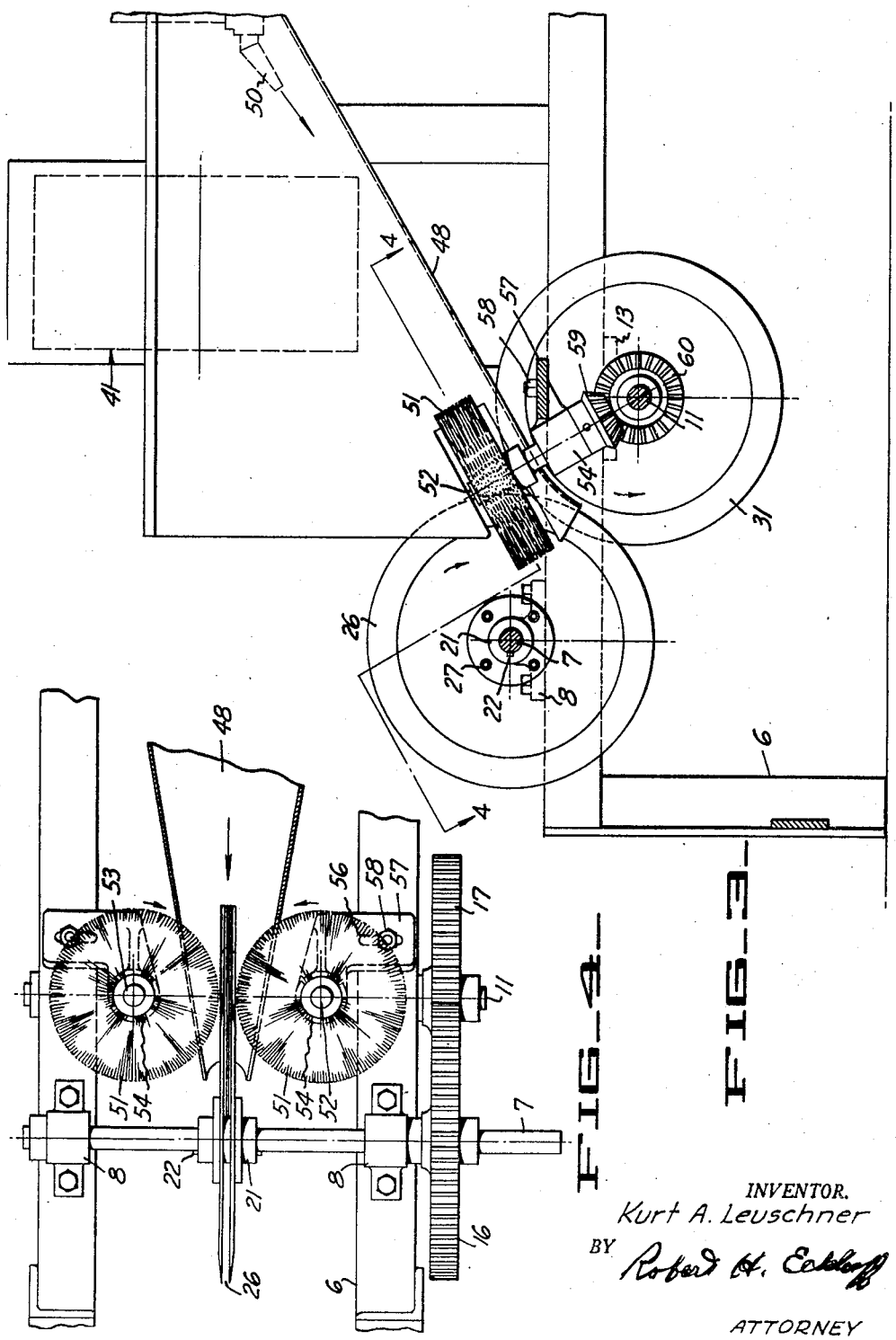

Patented May 15, 1951

2,552,984

UNITED STATES PATENT OFFICE 2,552,984

METHOD FOR FILLETING FISH

Kurt Alfred Leuschner, Seaside, Calif., assignor to Harry A. Irving, Atherton, Calif.

Application March 11, 1949, Serial No. 80,839

4 Claims. (Cl. 17—45)

This invention relates to the preparation of fillets from fresh fish, and particularly to a method for cutting fillets from fresh fish.

Generally, the invention relates to a method of the type disclosed in the prior Hutton Patent 2,311,176 and wherein a fresh fish having only the head and the tail removed is cut by a pair of spaced rotary knives so as to cut a narrow V-cut in the fish, leaving the bone structure and entrails of the fish intact. This operation is quite successful, but it is subject to certain shortcomings. To ensure that the entrail portion of the fish is not cut, it is necessary to leave considerable meat on the sides of the fish. In accordance with the present invention, I propose to remove the head and tail portions of the fish and then to eviscerate the fish; these operations can be performed by hand or by machines, such as are shown in the Durand Patent 2,210,234, and in the McGrew Patent 2,192,838. The tailless, decapitated and eviscerated fish is then moved subject to sufficient pressure to close the empty belly cavity and, while this is closed, a fillet is severed from each side of the backbone structure of the fish. Thus, I am able to cut more fillet from the fish so that a substantially increased yield of fillet is secured from a given weight of fish. In addition, the fish having been eviscerated, the fillets are free of any of the entrail portion.

In general, it is the broad object of the present invention to provide a novel and simple method for the preparation of fish fillets from fresh fish.

The invention includes other objects and features of advantage, some of which, together with the foregoing, will appear hereinafter wherein a present preferred machine embodying the invention is set forth. In the drawings accompanying and forming a part hereof.

Figure 1 is a front view of a machine embodying the invention.

Figure 2 is an enlarged sectional view showing the knife arrangement and the provision of these with respect to a fish undergoing cutting.

Figure 3 is a side elevation of the machine shown in Figure 1 and taken along the line 3—3 of Figure 1.

Figure 4 is a plan view of a portion of the machine shown in Figure 1 and taken along line 4—4 of Figure 3.

Referring to the drawings, a suitable frame structure, generally indicated at 6, is required. A first shaft 7 is mounted in bearings 8 upon opposite sides of the frame; a second shaft 11 is also mounted upon the frame and is supported for rotation in bearings 12 and 13. Shaft 7 carries a gear 16 in mesh with gear 17 on shaft 11 so that the two are driven in a timed relation and in opposite directions, shaft 7 being driven by a suitable prime mover, not shown.

Slidably mounted upon shaft 7 are a pair of hubs 21; each hub includes a key 22, slidable in a keyway 23, and having a set screw 24 therein to maintain the hub in the desired position of adjustment along the shaft. Each hub carries a circular knife blade 26 secured thereto by bolts 27. The hubs are spaced apart as by a suitable, removable spacer 28, the latter being of a width corresponding to that desired as the spacing between the knives, such spacing being dictated by the width of the backbone structure in the fish handled.

A similar adjustable knife structure is provided upon shaft 11, the second pair of knives each being generally indicated by numeral 31. Referring particularly to Figure 2, it is to be noted that each of the knives 26 tapers from the outside face thereof to a knife edge 32, while each of the knives 31 tapers from the inside edge thereof to a knife edge 32 so that the overlapping portion of the two sets of circular knives are in face-to-face abutment and so that the cuts made in the fish overlap, but only to such an extent that the fillets are severed completely from the central portion of the fish; the cut face on each fillet is smooth and continuous and the overlap is not apparent.

Referring particularly to Figure 1, a suitable conveyor mechanism is generally indicated by numeral 41. This includes a flexible belt 42 trained about a sprocket 43, the belt 42 having a plurality of spaced carriers 45 thereon defining recesses 44 in which tailless, decapitated fish, generally indicated by numeral 46, are carried, a guard 47 retaining these in place as the conveyor moves about the sprocket 43, to release the tailless, decapitated and eviscerated fish to fall into a suitable trough 48 which slopes toward the knives. A stream of water is normally directed on the trough 48 so that the fish slide readily down the sloping trough and toward the circular knives.

To align the fish and to feed them into the circular knives, I preferably provide suitable feeding means; in the form illustrated in the drawings, such feeding means comprises two flexible fiber brushes 51 each mounted upon shafts 52 and 53, the latter being carried in bushings 54 and being mounted upon and being adjustable with respect to frame 6, as by slot 56 in bushing bracket 57 and bolts 58. Shafts 52 and 53 are driven by a pinion 59 meshed with another pinion 60 on shaft 11.

In practice, I have found it advisable that the brushes rotate at a peripheral speed which is about twice that of the circular knives, so that the fish is fed in positively to the knives. However, once the fish is engaged with the knives, these exert a forward feeding action of their own upon the fish and it is only necessary to start a fish into engagement with the knives to have it pass through quickly, severing a fillet from each side and throwing these off to one side; that is, one fillet goes to the right-hand side of the machine, the other fillet goes to the left-hand side of the machine while the bone structure associated with the central portion of the fish moves forward to be collected and thrown away, or utilized for fertilizer.

It is to be noted that the brushes rotate in opposite directions to move a fish positively into the knives, the brushes rotating and engaging the fish in a plane which is substantially normal to a plane passed through shafts 7 and 11 and substantially parallel and coincident with a plane passed through the extreme boundaries of the area of overlap of the four knives. The fiber brushes act to close the fish belly, feed the fish and maintain it in alignment as it engages the knives.

Referring particularly to Figure 2, it is to be noted that trough 48 is so fashioned that, in cooperation with the feeding action of the brushes, the eviscerated fish is pressed together so that the belly cavity of the fish is more or less closed to insure cutting of a minimum of the belly portion of the fish and a maximum cutting of the available and desirable meat of the fish.

From the foregoing, I believe it will be apparent that I have provided a novel and simple method for the preparation of fish fillets from fresh fish and which can be readily used upon fish of various sizes to provide an increased yield of meat therefrom amounting to 25% and more.

I claim:

1. A method of preparing fish fillets from a whole fish having a head, tail and entrails comprising removing the head and tail from the fish, removing the entrails through the head end of the fish to leave the belly portion of the fish uncut and empty, forcing together opposite sides of the fish to close the empty belly cavity in the fish and confine the bone structure and belly walls of the fish to a region substantially the width of the spine and, while the belly is so closed, cutting the fish on each side thereof in two parallel planes each substantially parallel to the fish spine and normal to a minor transverse axis of the fish, the cuts made along said planes being separated by substantially only the width of the spine of the fish to sever a fillet from each fish side.

2. A method of preparing fish fillets from a whole fish having a head, tail and entrails comprising removing the head and tail from the fish, removing the entrails through the head end of the fish to leave the belly portion of the fish uncut and empty, forcing together opposite sides of the fish to close the belly cavity in the fish and confine the bone structure and belly walls of the fish to a region substantially the width of the spine and, while the belly is so closed, cutting the fish along one side thereof in two parallel planes each substantially parallel and closely adjacent to the fish spine on one side thereof and normal to a minor axis of the fish, the cuts being made from the top and the belly side of the fish and the cut made from the top of the fish lying closer to the fish spine than the cut from the belly side of the fish, said planes overlapping one another to sever a fillet from the fish side.

3. A method of preparing fish fillets from a whole fish having a head, tail and entrails normally enclosed in a belly cavity defined by ribs extending arcuately from a spine comprising removing the head and tail from the fish, removing the entrails through the head end of the fish to leave the belly portion of the fish uncut and empty, forcing together opposite sides of the fish to compress the ribs sufficiently to close the empty belly cavity in the fish and confine the ribs to a region substantially the width of the spine and, while the belly is so closed, cutting the fish on each side thereof inwardly from the top and the belly side of the fish in two parallel planes each substantially parallel to the fish spine and normal to a minor transverse axis of the fish, the cuts made along said planes being separated by substantially only the width of the spine of the fish to cut a fillet from each fish side, the cuts made from the top being inside and closer to the spine than these made from the belly side of the fish.

4. A method of preparing fish fillets from a whole fish having a head, tail and entrails normally enclosed in a belly cavity defined by ribs extending arcuately from a spine comprising removing the head and tail from the fish, removing the entrails through the head end of the fish to leave the belly portion of the fish uncut and empty, then forcing together opposite sides of the fish to compress the ribs sufficiently to close the empty belly cavity in the fish and compress the ribs to within a region superimposed with respect to the spine and, while the belly is so closed, cutting the fish on each side thereof inwardly from the top along a first pair of parallel planes and from the bottom along a second pair of parallel planes, each of said pairs of parallel planes being substantially parallel to the plane of the fish spine and compressed belly cavity rib structure of the fish and normal to a minor transverse axis of the fish, said first pair of parallel planes being separated by substantially only the spine of the fish and said second pair of parallel planes being separated by substantially only the compressed belly cavity rib structure of the fish, the cuts made along said first and said second pairs of planes overlapping to sever a fillet from each fish side.

KURT ALFRED LEUSCHNER.

REFERENCES CITED

The following references are of record in the file of this patent:

UNITED STATES PATENTS

| Number | Name | Date |
|---|---|---|
| 1,728,254 | Rieska | Sept. 17, 1929 |
| 2,179,821 | Hunt | Nov. 14, 1939 |
| 2,431,893 | Savrda | Dec. 2, 1947 |

FOREIGN PATENTS

| Number | Country | Date |
|---|---|---|
| 630,470 | Germany | May 28, 1936 |